J. T. FENTON.
SYSTEM OF FEEDING MATERIAL TO TREATING CHAMBERS.
APPLICATION FILED MAR. 29, 1921.
1,432,170.
Patented Oct. 17, 1922.
2 SHEETS—SHEET 1.
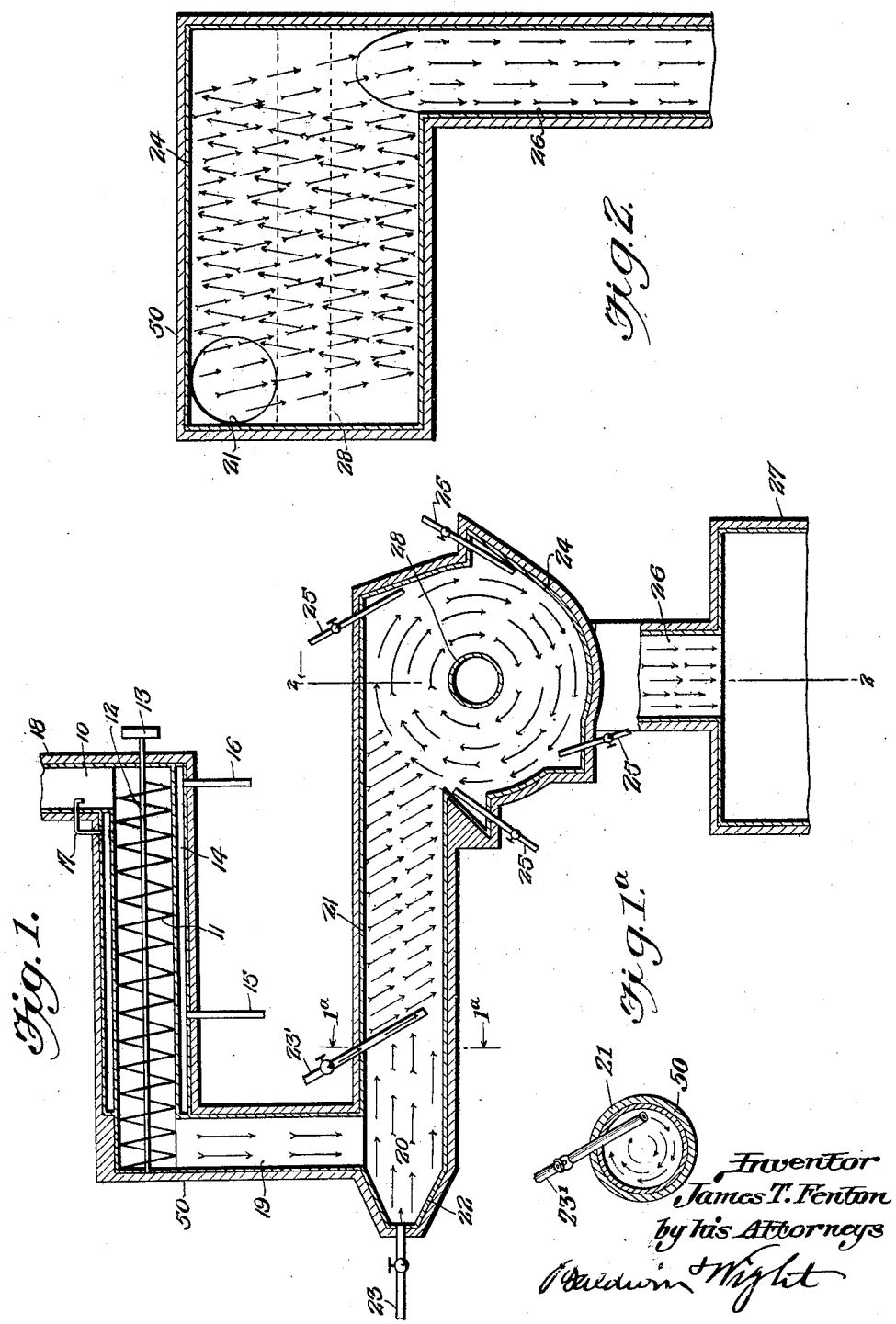

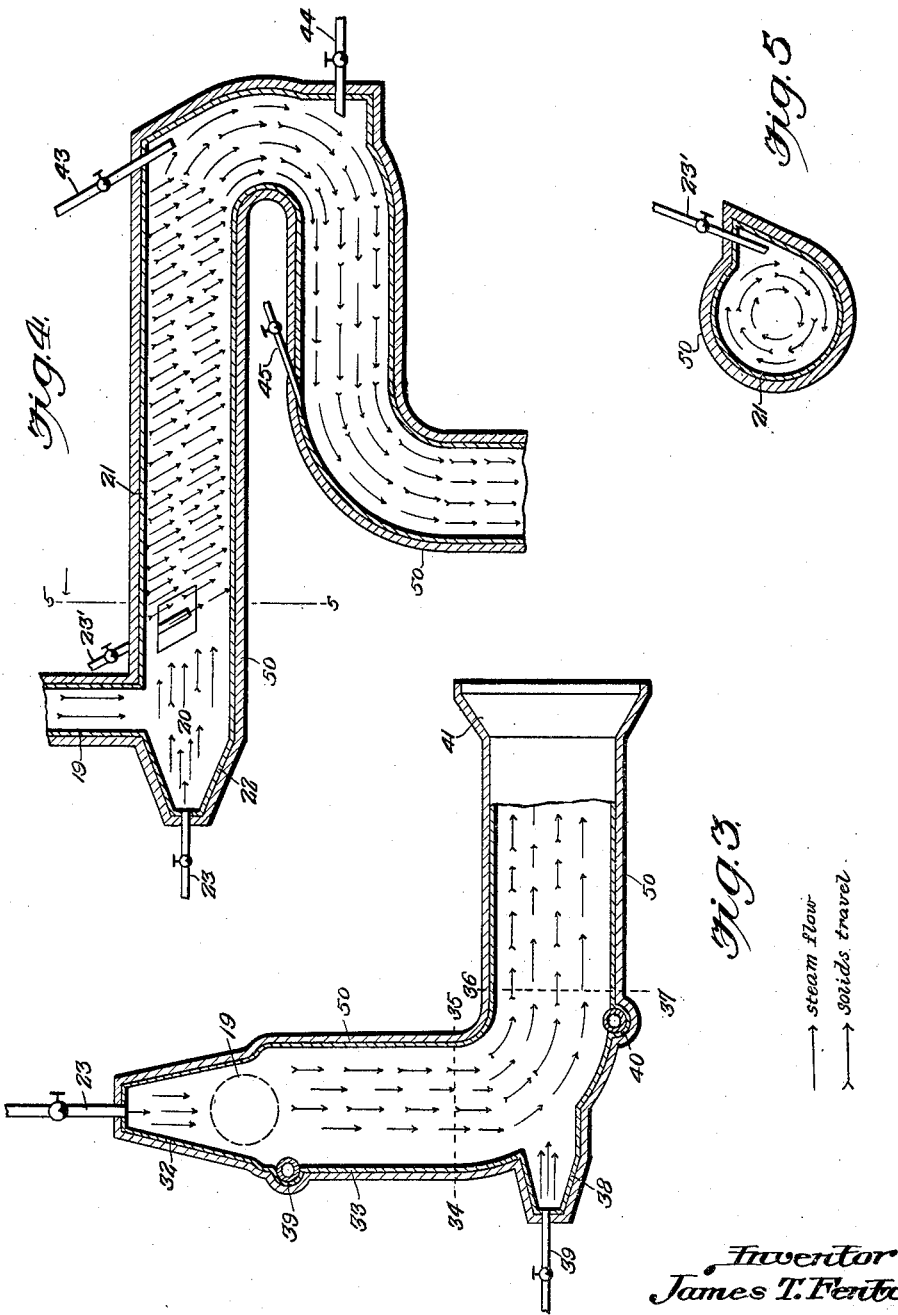

Patented Oct. 17, 1922.

1,432,170

UNITED STATES PATENT OFFICE.

JAMES T. FENTON, OF SALT LAKE CITY, UTAH.

SYSTEM OF FEEDING MATERIAL TO TREATING CHAMBERS.

Application filed March 29, 1921. Serial No. 456,775.

*To all whom it may concern:*

Be it known that I, JAMES T. FENTON, a citizen of the United States, residing at Salt Lake City, in the county of Salt Lake and State of Utah, have invented certain new and useful Improvements in Systems of Feeding Material to Treating Chambers, of which the following is a specification.

The present invention relates to the feeding of finely divided solid material into retorts or similar treating chambers, in which such material is to be distilled or otherwise treated. The device is especially applicable in the distillation of shale, oil sands, sulfur ore and other similar products in which substances can be vaporized from a material which is kept, during such operation, substantially in a solid granular or pulverulent condition.

The accompanying drawings show a number of different modifications of apparatus coming within the scope of the present invention although it is to be understood that these drawings are intended to be illustrative rather than restrictive, the scope of the invention being limited by the appended claims only.

Figure 1 shows a vertical section of one form of apparatus Figure 1ª a section on the line 1ª—1ª of Fig. 1, and Figure 2 shows a vertical section taken approximately on the line 2—2 of Figure 1. Figure 3 shows a plan view of another form of apparatus within the scope of the present invention. Figure 4 shows a still further modification. Figure 5 represents a section approximately on the line 5—5 of Figure 4.

Referring now more particularly to Figures 1 and 2, a vertical feed pipe 10 is provided through which the material to be treated, for example sulfur ore, is fed from any suitable source. In the bottom of the pipe is connected a substantial horizontal pipe 11 provided with a worm conveyor 12 operated by a suitable pulley 13. The pipe 11 is preferably jacketed as with a steam jacket 14, having a steam inlet 15 and an outlet 16 for water of condensation. Another outlet 17 leads into the vertical pipe 10 and terminates at the downwardly extending end 18, through which steam is introduced preferably in a downward direction into the feed pipe 10.

Connected to the left hand or discharge end of the pipe 11 is a downwardly extending feed chute 19, through which the material falls into the mixing chamber 20. The pipe 21 (hereinafter referred to as the horizontal conveyor) is joined at a point intermediate of its two ends to the vertical feed chute 19. The front portion of the pipe 21, namely the part in front (or to the left in Figure 1) of the chute 19 being tapered to form a conical end 22 into which extends axially the steam inlet pipe 23. Steam from this pipe will expand as indicated by the arrows to fill substantially the entire cross-section of the mixing chamber and of the pipe 21 whereby the said steam becomes thoroughly mixed with the solid matter under treatment.

For the purpose of more thoroughly mixing the material with steam, a pipe 23' is provided, entering the pipe 21 substantially tangentially but at an angle to the length of the pipe 21, whereby a rotary motion is imparted to the steam and solid matter travelling through the pipe 21.

Coupled to the end of pipe 21 is a cylindrical chamber 24, in which there are provided a plurality of tangential steam inlet pipes 25, whereby the material is subjected to additional changes of direction before finally reaching the outlet pipe 26, through which the said material is fed into a suitable retort, or other treating chamber illustrated diagrammatically at 27. The passage 26 may lead off radially from the cylindrical member 24 or if desired, this passage may lead off tangentially as shown in Figure 2.

The core 28 shown in Figures 1 and 2 may be omitted if desired, but frequently is useful in order to produce a more effective mixing of the solids with the steam.

In Figure 3 is shown a plan section of another form of apparatus within the scope of the present invention. The dotted circle 19 represents the location or projection of said chute 19 as shown in Figure 1. At 32 is shown the conical front end of the conveyor pipe; at 33 is shown the conveyor pipe, which is provided with a bend forming substantially a right angle. This bend occupies the portion of the pipe between the plane 34—35 and the plane 36—37. At 38 is shown a conical projection attached to the conveyor pipe and provided with a steam inlet pipe 39. This additional blower is for the purpose of changing the direction of travel of the solid material pneumatically, whereby the erosion or rapid wearing of the curved portion of the pipe is prevented.

At 39 and 40 are shown tangential steam inlets which may be employed if desired for the purpose of imparting a whirling motion to the solids and steam traveling through the pipe. At 41 is a coupling or connection by which the material from the pipe 33 may enter a suitable retort or other treating receptacle.

Referring now more particularly to the modifications shown in Figure 4, the parts 19, 20, 21, 22, 23 and 23' all correspond to the same numerals as used in Figure 1. The direction of travel of the material in the modification is effected by means of the steam jets 43, 44, 45 located in, and delivering at an angle to the main conducting pipe, these preferably entering tangentially, at an angle.

As will be apparent from Figure 5, the tangential inlets 23' produce a whirling motion of the steam and of the solid materials travelling through the pipe. These pipes are also located preferably at an angle to the direction of the main conducting pipe at the point of entry in order to accelerate the flow of solid materials through the pipe.

It is to be understood that the entire apparatus (or the major portion thereof if desired) can be covered with heat insulation, as shown at 50.

In the above description, I have referred to steam as being introduced at 23, 23', 39, 40, 43, 44, 45. It is to be understood that superheated steam is the preferred material to employ, although in some instances other highly heated compressed vapors or gases (elastic fluids), chemically inert with respect to the material operated upon, can be employed, nitrogen, carbon dioxid, natural gas, coal gas, ordinary chimney gases and the like being suitable. These may be at a temperature of, say, 500 to 1000° F., and at a pressure of 50 to 500 lbs.

In any event, the steam or other elastic fluid will be introduced at a temperature high enough to initiate the vaporization of some of the volatilizable constituents of the material under treatment. The temperature of the elastic fluid is accordingly best adjusted with respect to the specific material under treatment. Thus without limiting myself unduly, a convenient temperature of the steam, when treating crude sulfur ore (composed essentially of elemental sulfur, clay, sand, etc.), may be 1000 to 1100° F., (sulfur boiling at about 840° F.), although higher or lower temperatures can be used.

The introduction of steam at 17 is not primarily for heating, but to displace the air in the material being fed, so that the jet blower 22—23 will not suck air into the apparatus and thereby injure the material under treatment. Waste steam from the jacket, or steam from any other source, or inert gases could likewise be used, either hot or cold, hot preferred.

I claim:

1. An apparatus for feeding subdivided solid matter into an air-tight treating chamber in which it is to be subjected to treating operations, such apparatus comprising a downwardly extending chute, a conveying pipe, the front portion of which is substantially horizontal, a conical front end to such conveying pipe, situated in front of said downwardly extending chute, an inlet pipe, for highly compressed gaseous fluid located at the small end of said conical member, such inlet pipe being directed toward a point below such chute.

2. An apparatus for feeding subdivided solid matter into an air-tight treating chamber in which it is to be subjected to treating operations, such apparatus comprising a downwardly extending chute, a conveying pipe, the front portion of which is substantially horizontal, a conical front end to such conveying pipe, situated in front of said downwardly extending chute, an inlet pipe for highly compressed gaseous fluid located at the small end of said conical member, such inlet pipe, being directed toward a point below such chute and blast pipes projecting at angles into such conveying pipe at points behind said chute.

3. An apparatus for feeding subdivided solid matter into an air-tight treating chamber in which it is to be subjected to treating operations, such apparatus comprising a downwardly extending chute, a conveying pipe, the front portion of which is substantially horizontal, a conical front end to such conveying pipe, situated in front of said downwardly extending chute, an inlet pipe for highly compressed gaseous fluid located at the small end of said conical member, such inlet pipe being directed toward a point below such chute and blast pipes some of which project tangentially into said conveying pipe.

4. A feed apparatus for feeding divided solid material to an air-tight treating chamber, comprising a downwardly extending feed flue, a steam inlet thereto, a somewhat horizonal pipe having conveying means therein, a heating jacket therefor, a downwardly extending feed chute leading from said pipe to a conveying pipe somewhat horizontal at its front portion, and into an intermediate portion of which the said feed chute delivers, the portion of such conveying pipe in front of said feed chute being tapered, and an axial steam supply pipe at the small end of said tapered portion, and additional steam supply pipes delivering angularly in the direction of flow of the material therein, into said conveying pipe.

5. A feed apparatus for feeding divided solid material to an air-tight treating chamber, comprising a downwardly extending feed flue, a steam inlet thereto, a somewhat horizontal pipe having conveying means therein, a heating jacket therefor, a downwardly extending feed chute leading from said pipe having conveying means, a conveying pipe somewhat horizontal at its front portion, and into an intermediate portion of which the said feed chute delivers, the portion of such conveying pipe in front of said feed chute being tapered, and an axial steam supply pipe at the small end of said tapered portion, and additional steam supply pipes delivering angularly in the direction of flow of the material therein, into said conveying pipe, said additional pipes entering substantially tangentially of said conveying pipe.

6. A process of conveying finely divided solid material to an airtight treating chamber, which comprises injecting into a stream of said material a chemically inert fluid in sufficient volume to displace the air, forcing said material through a pipe by means of an elastic fluid injected tangentially thereinto with sufficient force to carry said material and injecting tangential jets of hot elastic fluid into the traveling stream of material and conveying fluid.

7. A process of conveying finely divided solid material to an airtight treating chamber, which comprises injecting into a stream of said material, steam in sufficient volume to displace the air, forcing said material through a pipe by means of an elastic fluid injected tangentially thereinto with sufficient force to carry said material and injecting tangential jets of hot elastic fluid into the traveling stream of material and conveying fluid.

8. A process of conveying finely divided solid material to an airtight treating chamber, which comprises injecting into a stream of said material, steam in sufficient volume to displace the air, forcing said material through a pipe by means of an elastic fluid injected tangentially thereinto with sufficient force to carry said material, and injecting tangential jets of steam into the traveling stream of material and conveying fluid.

9. A process of conveying material containing volatile ingredients to an air tight treating chamber which comprises injecting into a stream of said material a chemically inert fluid in sufficient volume to displace the air, forcing said material through a pipe by means of an elastic fluid injected thereinto with sufficient force to carry said material and at a temperature sufficient to vaporize some of the volatile ingredients, and injecting tangential jets of hot elastic fluid into the traveling stream of material and conveying fluid.

10. A process of conveying material containing volatile ingredients to an airtight treating chamber which comprises injecting into a stream of said material steam in sufficient volume to displace the air, forcing said material through a pipe by means of an elastic fluid injected thereinto with sufficient force to carry said material and at a temperature sufficient to vaporize some of the volatile ingredients, and injecting tangential jets of hot elastic fluid into the traveling stream of material and conveying fluid.

11. A process of conveying material containing volatile ingredients to an airtight treating chamber which comprises injecting into a stream of said material steam in sufficient volume to displace the air, forcing said material through a pipe by means of an elastic fluid injected thereinto with sufficient force to carry said material and at a temperature sufficient to vaporize some of the volatile ingredients, and injecting tangential jets of hot steam into the traveling stream of material and conveying fluid.

12. A process of conveying finely divided solid material to an airtight treating chamber which comprises displacing the air normally carried by said material by an inert elastic fluid, and forcing said material through a pipe by means of an elastic fluid injected thereinto with sufficient force to carry the material.

13. The process of conveying finely divided solid material to an airtight treating chamber which comprises displacing the air by steam, and forcing said material through a pipe by means of an elastic fluid injected thereinto with sufficient force to carry the material.

14. The process of conveying finely divided solid material to an airtight treating chamber which comprises displacing the air with an inert elastic fluid, feeding the material in a tortuous course to said chamber, and directing into the stream of material, at a point in advance of a change in direction, a jet of inert elastic material.

In testimony whereof, I have hereunto subscribed my name.

JAMES T. FENTON.